No. 686,501. Patented Nov. 12, 1901.
J. D. ARTZ.
UNIVERSAL GEAR COUPLING.
(Application filed Mar. 25, 1901.)

(No Model.)

WITNESSES

INVENTOR
J. D. Artz
By R. J. McCarty
ATTORNEY

UNITED STATES PATENT OFFICE.

JOHN D. ARTZ, OF DAYTON, OHIO.

UNIVERSAL GEAR-COUPLING.

SPECIFICATION forming part of Letters Patent No. 686,501, dated November 12, 1901.

Application filed March 25, 1901. Serial No. 52,745. (No model.)

*To all whom it may concern:*

Be it known that I, JOHN D. ARTZ, a citizen of the United States, residing at Dayton, in the county of Montgomery and State of Ohio, have invented certain new and useful Improvements in Universal Gear-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in universal gear-couplings, and comprises the structural features hereinafter described and claimed.

Referring to the accompanying drawings, my invention is illustrated therein and comprises a sprocket-wheel, a shaft to be driven thereby or to drive said wheel, and a pivotal connection between the wheel and said shaft, whereby the wheel is permitted to assume various angles with relation to the shaft.

Figure 1:
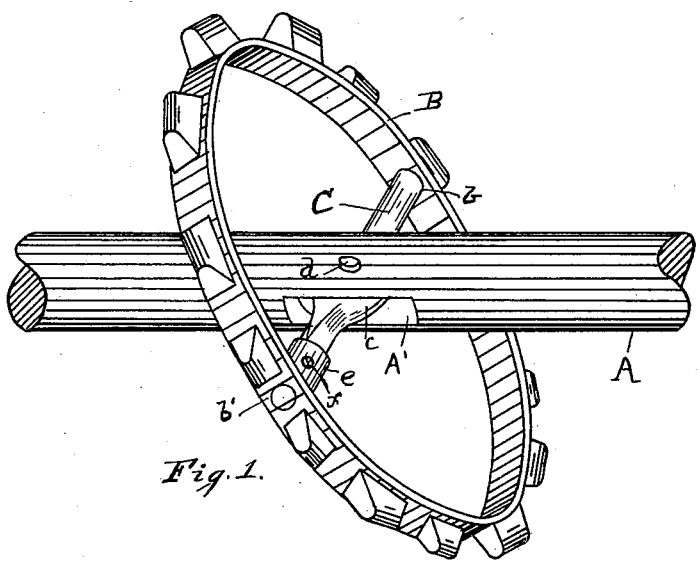
Figure 2:
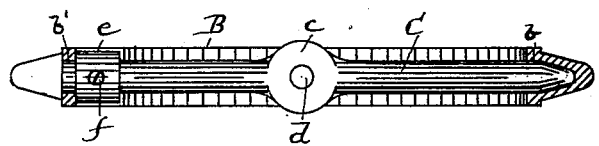

Figure 1 is a perspective view of a coupling made in accordance with my invention. Fig. 2 is a cross-section through the wheel.

In a more detailed description of my invention, A designates a shaft to drive or to be driven. This shaft has a longitudinal slot A' therein.

B designates in the present instance a chain-wheel. This wheel may, however, be substituted by a belt-wheel or a spur-gear or any wheel having a capacity for transmitting motion to the shaft A.

$b$ $b'$ designate openings on opposite sides of the wheel.

C is a spindle, the ends of which are supported in the openings $b$ $b'$ in the wheel. The central part of this spindle has an enlargement or boss $c$ with an opening in the center thereof. The said spindle is pivoted in the slot A' by means of a pin $d$, which passes through the shaft A and the boss of said spindle, so that the spindle C has a pivotal connection with the shaft A, which allows the wheel to assume various angular positions with reference to the shaft.

$e$ is a collar which fits over one end of the spindle and holds said spindle in the wheel. The means for securing said collar on said spindles consists of a set-screw $f$. It will be observed that one of the openings in the wheel—to wit, $b$—projects into one of the teeth in said wheel, but not entirely through said tooth. Therefore the spindle is prevented from moving out of the wheel in that direction. The collar $e$ prevents said spindle from longitudinal movement in the opposite direction. In the mounting of wheels two of such collars $e$ may be employed; but in cases where one of the openings projects into a tooth of the wheel or not entirely through the rim only one of such collars is necessary. In placing the spindle C in position the collar $e$ is loosened and moved toward the shaft A. The uncollared end of the spindle may then be inserted through the opening $b'$, then backed into the opening $b$, and then the collar $e$ is moved out to the inner periphery of the wheel and there made fast by the set-screw $f$.

In Fig. 1 of the drawings it will be seen that the wheel may assume different angles with reference to shaft A, either to the right or to the left. In these movements the wheel moves upon the ends of the spindle C. The wheel may also have movements at right angles to the first-named movement upon the pivot $d$, this movement being limited by the length of the slot A'.

This coupling is very useful as a means of gear-shafts to be driven in inaccessible places, and is especially adapted to a variety of agricultural implements; but its use, as will be apparent, is not limited.

Having described my invention, I claim—

1. The herein-described universal gear-coupling comprising a shaft, said shaft having a longitudinal opening therein, a spindle projected through said opening and having a pivotal connection with said shaft, a wheel, the said wheel having pivotal connections with said spindle on opposite sides, and a means whereby the pivotal connections between such spindle and such wheel are maintained, substantially as specified.

2. In a universal gear-coupling, the combination of a shaft having a longitudinal opening, a spindle projected through said opening, said spindle having a pivotal connection with said shaft, a wheel, said wheel having journal-openings $b$ and $b'$ in opposite sides, one of said openings projecting only partially into said wheel, and the other of said openings being entirely through the rim of the wheel, the said openings providing means for
5 connecting the ends of the spindle with the wheel and whereby pivotal connections between said wheel and spindle are provided.

In testimony whereof I affix my signature in presence of two witnesses.

JOHN D. ARTZ.

Witnesses:
  R. J. McCarty,
  C. M. Theobald.